Nov. 29, 1938.    F. W. HANKS    2,138,159
FRANGIBLE BOLT-HOLDING CONSTRUCTION
Filed Nov. 25, 1936
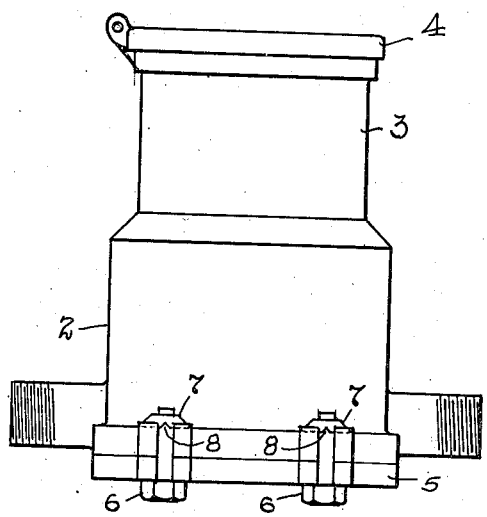
Fig. 1.
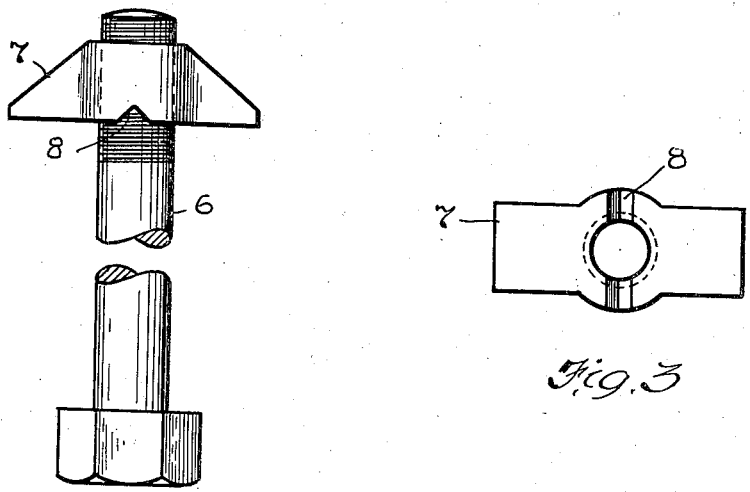
Fig. 2.
Fig. 3.
INVENTOR.
BY Frederick W. Hanks
Fay, Oberlin & Fay
ATTORNEYS.

Patented Nov. 29, 1938

2,138,159

UNITED STATES PATENT OFFICE 2,138,159

FRANGIBLE BOLT-HOLDING CONSTRUCTION

Frederick W. Hanks, Cleveland, Ohio

Application November 25, 1936, Serial No. 112,676

2 Claims. (Cl. 85—32)

Water meters are occasionally subject to more or less damage from freezing. To meet this contingency, modified designs with frangible walls or bottoms have been brought out which concentrate the damage on such part so that the metering mechanism is spared, and the meter can be repaired by putting in a new wall or bottom. This however necessitates taking the meter down and taking off the old wall or bottom and putting on a new one and replacing the meter. This is inconvenient and unduly expensive in many instances. A simpler and quicker means is highly desirable, and particularly in instances where special designs of meter are not wanted and it is desired that if repairs are made the meter should not be disturbed on its connections.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:—

Fig. 1 is a side elevational view showing an embodiment of the invention; and Figs. 2 and 3 are enlarged details in elevation and inverse plan respectively.

The meter comprising the fluid chamber portion 2 of detail as desired, surmounted by a gear chamber 3 and usual dial indicating means under the openable lid 4, is assembled with the lower or bottom section 5 by holding means which, in the event of a freeze-up, yields sufficiently to prevent damage of the parts. Thus, the bolts 6 holding the assemblage together, are provided with bolt-holding means 7 of yieldable character. Desirably, this involves an elongated member or head of oblong form beveled down toward each end, with a screw-threaded opening to take the bolt, and having a weakened zone yieldable on undue stress. A transverse weakening score or groove 8 across the narrow dimension of the member intersective of the bolt line is of particular advantage. With the bolts 6 in proper relation with the parts to be held, and the members 7 tight thereon like nuts, the construction will hold against ordinary amounts of stress. If however, the liquid within should freeze and expand, the members 7 yield under the undue stress at their weakened zone 8, and allow the assemblage to expand sufficiently to prevent damage of the meter parts. By thawing, and replacing new holding members 7 on the bolts, it is a simple matter to put the meter again in commission, and without the disturbance of a takedown.

Other modes of applying the principle of the invention may be employed, change being made as regards the details described, provided the features stated in any of the following claims, or the equivalent of such, be employed.

I therefore particularly point out and distinctly claim as my invention:—

1. A device of the character described, comprising a bolt-holding member of elongated form beveled down toward each end and with flat bearing face and having a screw-threaded bolt-receiving opening, and a weakening groove across the flat bearing face on a short dimension at the screw-threaded opening.

2. A device of the character described, comprising a bolt-holding member of elongated form and with flat bearing face and having a screw-threaded bolt-receiving opening, and a weakening groove on a short dimension of the holding member running into the screw-threaded opening.

FREDERICK W. HANKS.